US012221992B2

(12) United States Patent
Li et al.

(10) Patent No.: US 12,221,992 B2
(45) Date of Patent: Feb. 11, 2025

(54) FASTENING CLIP

(71) Applicant: Illinois Tool Works Inc., Glenview, IL (US)

(72) Inventors: Zhilin Li, Shanghai (CN); Haijie Yu, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/126,213

(22) Filed: Mar. 24, 2023

(65) Prior Publication Data

US 2023/0313820 A1    Oct. 5, 2023

(30) Foreign Application Priority Data

Mar. 31, 2022 (CN) .......................... 202210337112.0
Mar. 16, 2023 (CN) .......................... 202310270987.8

(51) Int. Cl.
*F16B 2/24* (2006.01)

(52) U.S. Cl.
CPC ...................................... *F16B 2/24* (2013.01)

(58) Field of Classification Search
CPC .......... F16B 2/24; F16B 21/20; F16B 21/205; F16B 21/073; F16B 5/12; F16B 37/0842; F16B 37/02
See application file for complete search history.

(56) References Cited

U.S. PATENT DOCUMENTS

| 2,236,929 | A |   | 4/1941  | Tinnerman |              |
|-----------|---|---|---------|-----------|--------------|
| 4,299,520 | A | * | 11/1981 | Iwata     | F16B 37/0842 |
|           |   |   |         |           | 411/259      |

(Continued)

FOREIGN PATENT DOCUMENTS

| EP | 4253773    | A1 | 10/2023 |
|----|------------|----|---------|
| FR | 2382607    | A1 | 9/1978  |
| JP | 2008051332 | A  | 3/2008  |

OTHER PUBLICATIONS

The office action for Application No. EP 23164846.0, dated Sep. 9, 2023, European Patent Office, Germany (2 pages).

(Continued)

*Primary Examiner* — Robert Sandy
*Assistant Examiner* — Rowland Do
(74) *Attorney, Agent, or Firm* — McAndrews, Held & Malloy, Ltd.

(57) ABSTRACT

The present application provides a fastening clamp, used for connecting a first component to a second component having a connecting post. The fastening clamp includes: a substrate on which a mounting hole is provided; at least two first retaining legs, and at least two second retaining legs, where the mounting hole is used to receive the connecting post of the second component, proximal ends of the at least two first retaining legs are connected to an edge of the mounting hole, proximal ends of the at least two second retaining legs are connected to the edge of the mounting hole, and the at least two first retaining legs and the at least two second retaining legs are on the same side of the substrate; where distal ends of the at least two second retaining legs are closer to the substrate than distal ends of the two first retaining legs, and the at least two first retaining legs and the at least two second retaining legs are configured to be able to collectively retain the connecting post of the second component in the mounting hole. The fastening clamp in the present application can be mounted on a cylindrical connecting post.

20 Claims, 9 Drawing Sheets

(56) References Cited

U.S. PATENT DOCUMENTS

| | | | | |
|---|---|---|---|---|
| 4,728,236 A | * | 3/1988 | Kraus | F16B 37/0842 |
| | | | | 411/525 |
| 4,859,129 A | * | 8/1989 | Kraus | F16L 3/237 |
| | | | | 411/908 |
| 4,911,594 A | | 3/1990 | Fisher | |
| 5,098,242 A | * | 3/1992 | Schaty | F16B 37/0842 |
| | | | | 411/908 |
| 5,195,860 A | * | 3/1993 | Steyn | F16B 21/20 |
| | | | | 411/526 |
| 5,833,422 A | * | 11/1998 | Haga | F16B 21/20 |
| | | | | 411/521 |
| 6,220,806 B1 | * | 4/2001 | Chapman | F16B 37/085 |
| | | | | 411/84 |
| 6,997,662 B2 | | 2/2006 | Nishikawa | |
| 7,059,022 B2 | * | 6/2006 | Yuta | F16B 19/008 |
| | | | | 24/297 |
| 7,182,563 B2 | * | 2/2007 | Wimmer | F16B 37/041 |
| | | | | 411/174 |
| 7,645,107 B2 | * | 1/2010 | Yoneoka | F16B 37/0857 |
| | | | | 411/433 |
| 7,818,940 B2 | * | 10/2010 | Herb | F16B 13/141 |
| | | | | 411/533 |
| 9,149,276 B2 | * | 10/2015 | Voss | A61B 17/10 |
| 9,346,593 B2 | | 5/2016 | Dang | |
| 2009/0187215 A1 | * | 7/2009 | Mackiewicz | A61B 17/0057 |
| | | | | 264/177.17 |
| 2012/0035630 A1 | * | 2/2012 | Roorda | A61B 17/064 |
| | | | | 606/155 |
| 2022/0243757 A1 | * | 8/2022 | Jessop | F16B 21/20 |

OTHER PUBLICATIONS

The extended European search report for Application No. 23164846.0, dated Aug. 4, 2023, European Patent Office, Germany (8 pages).

* cited by examiner

FASTENING CLIP

RELATED APPLICATIONS

The present application claims the benefit of Chinese Patent Application Nos. 2022103371120, filed Mar. 31, 2022, and 2023102709878, filed Mar. 16, 2023, each titled "Fastening Clip," the contents of which are hereby incorporated by reference.

TECHNICAL FIELD

The present application relates to a fastener, particularly in the automotive field, for connecting two components.

BACKGROUND

Fasteners can connect multiple components together, such as interior parts, frames, and panels of a vehicle. A first component is first connected to a fastener when connected, and then the fastener connected to the first component is mounted at a corresponding position of a second component; or the fastener is first mounted at a corresponding position of the second component, and then the fastener is connected to the first component, so that the first component and the second component are connected to each other. For example, in an application, a vehicle wire clamp needs to be connected to a body sheet metal by a using fastener such that an interior panel is securely connected to the body sheet metal.

SUMMARY

The present application provides a fastening clamp, used for connecting a first component to a second component having a connecting post, including: a substrate on which a mounting hole is provided; at least two first retaining legs, and at least two second retaining legs, where the mounting hole is used to receive the connecting post of the second component, proximal ends of the at least two first retaining legs are connected to an edge of the mounting hole and extend obliquely from one side of the substrate towards one another in a direction away from the substrate, the at least two first retaining legs are resilient and configured to deflect about the proximal ends of the at least two first retaining legs, proximal ends of the at least two second retaining legs are connected to the edge of the mounting hole and extend obliquely from one side of the substrate towards one another in a direction away from the substrate, and the at least two first retaining legs and the at least two second retaining legs are on the same side of the substrate; where distal ends of the at least two second retaining legs are closer to the substrate than distal ends of the two first retaining legs, and the at least two first retaining legs and the at least two second retaining legs are configured to be able to collectively retain the connecting post of the second component in the mounting hole.

According to the fastening clamp described above, the at least two second retaining legs are staggered with the at least two first retaining legs about the mounting hole.

According to the fastening clamp described above, the at least two second retaining legs and the at least two first retaining legs are arranged along a circumferential direction, the fastening clamp being clampable on the cylindrical connecting post of the second component and rotating relative to the connecting post of the second component, the at least two second retaining legs being in contact with a sidewall of the connecting post of the second component.

According to the fastening clamp described above, each of the at least two first retaining legs and each of the at least two second retaining legs have a first contact and a second contact, respectively, the first contact being capable of contacting the second contact and the connecting post of the second component, and the first contact and the second contact extending helically around a centerline of the mounting hole.

According to the fastening clamp described above, a distance between the first contact and the centerline of the mounting hole is greater than a distance between the second contact and the centerline of the mounting hole.

According to the fastening clamp described above, the substrate has a first side and a second side, the at least two second retaining legs and the at least two first retaining legs extend outwardly from the first side, and the second side of the substrate has an anti-release structure.

According to the fastening clamp described above, the substrate has a front side and a back side, the fastener is inserted into a mounting component in a direction from the front side to the back side, the anti-release structure is a convex portion protruding from a surface of the second side, and the convex portion tapers and gradually becomes thicker in the direction from the front side to the back side.

According to the fastening clamp described above, the fastening clamp is integrally made of a metallic material.

According to the fastening clamp described above, hardness of the first contact and the second contact is greater than hardness of the connecting post of the second component.

According to the fastening clamp described above, a front side of the substrate has a front side flap bent inwardly from an edge of the front side, and the front side flap extends in the same direction as the substrate.

According to the fastening clamp described above, the back side of the substrate has a back side flap extending from an edge of the back side in a direction away from the first side of the substrate to form a stop portion.

According to the fastening clamp described above, the substrate has a stiffener protruding from a surface of the first side of the substrate, the stiffener is proximate to the back side of the substrate, and the stiffener is an arc curved toward a centerline of the mounting hole of the substrate.

The present application also provides a fastening clamp assembly, including: the fastening clamp described above and a connection seat; where the connection seat has a pair of receiving slots and a bottom, both sides of the substrate being able to enter the pair of receiving slots respectively to restrict movement of the fastening clamp in a direction perpendicular to the substrate; the bottom having an opening that aligns with the mounting hole when the fastening clamp is mounted in the connection seat.

According to the fastening clamp assembly described above, the connection seat has a pair of sides extending from both sides of the bottom, the pair of sides are disposed oppositely, and each of the pair of sides includes a sidewall and a convex edge, where the sidewall is connected to the bottom, the convex edge extends from the sidewall towards the other side of the pair of sides, and the side and the convex edge enclose to form a receiving slot in a pair of receiving slots.

According to the fastening clamp assembly described above, the connection seat is removably connected or integrally formed with the first component.

The fastening clamp in the present application can be connected to a cylindrical part of a vehicle.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Various specific embodiments of the present disclosure will be described below with reference to the attached drawings that form a part of this Specification. It should be understood that while terms denoting orientation, such as "front," "rear," "upper," "lower," "left," "right," etc., are used in the present application to describe various exemplary structural parts and elements of the present application, these terms are used herein for convenience of illustration only and are determined based on the exemplary orientations shown in the attached drawings. Since the examples disclosed in the present application may be disposed in different orientations, these terms denoting orientation are for illustrative purposes only and should not be considered as limiting. The same or similar reference numerals used in the present application refer to the same components where possible.

Figure 1A:
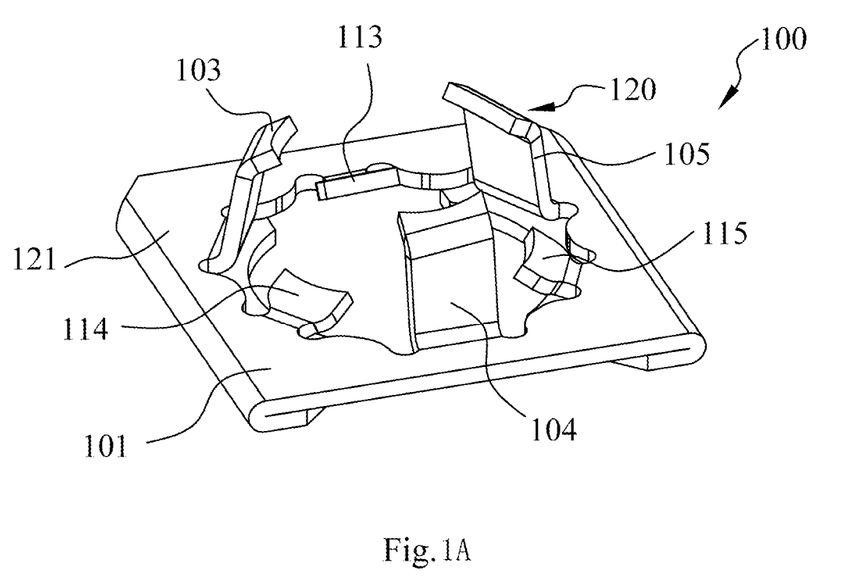
FIG. 1A is a perspective view of a first example of a fastening clamp in the present application.
Figure 1B:
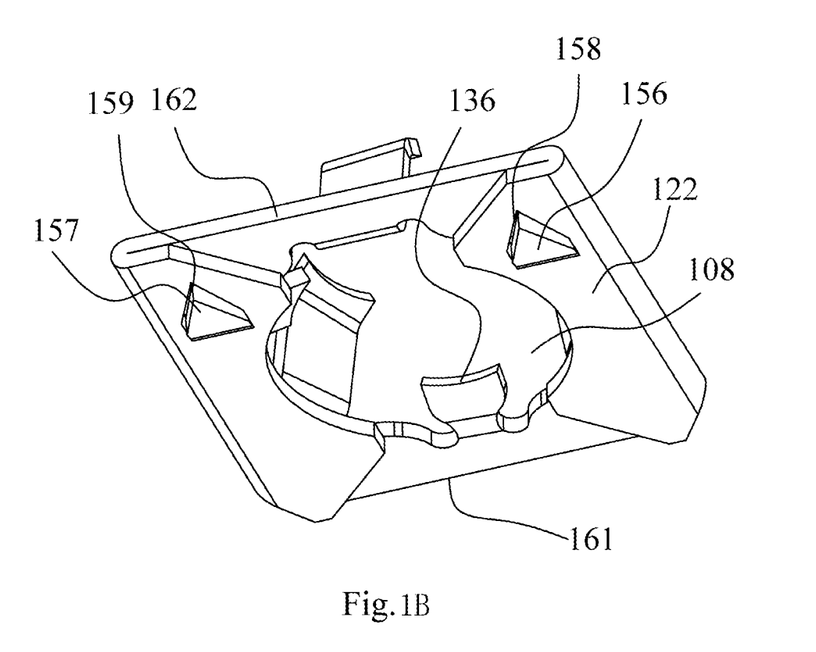
FIG. 1B is a perspective view of the fastening clamp of FIG. 1A at a second angle.
Figure 1C:
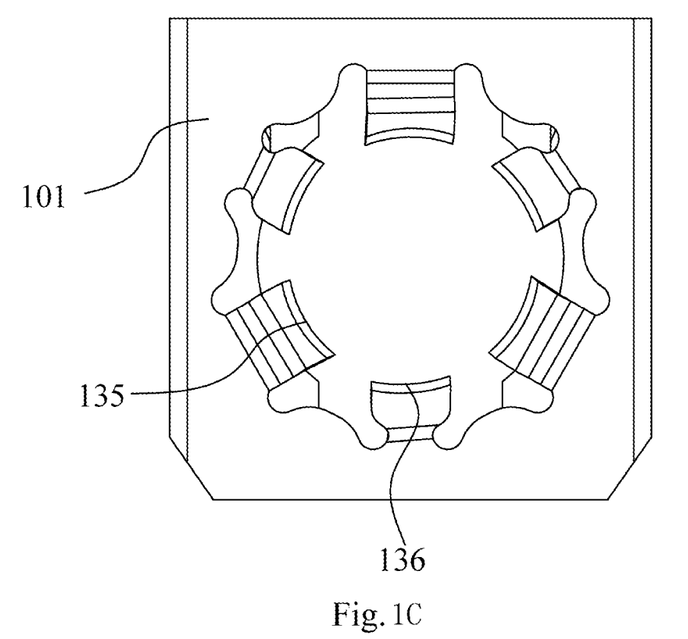
FIG. 1C is a top view of the fastening clamp of FIG. 1A.
Figure 1D:
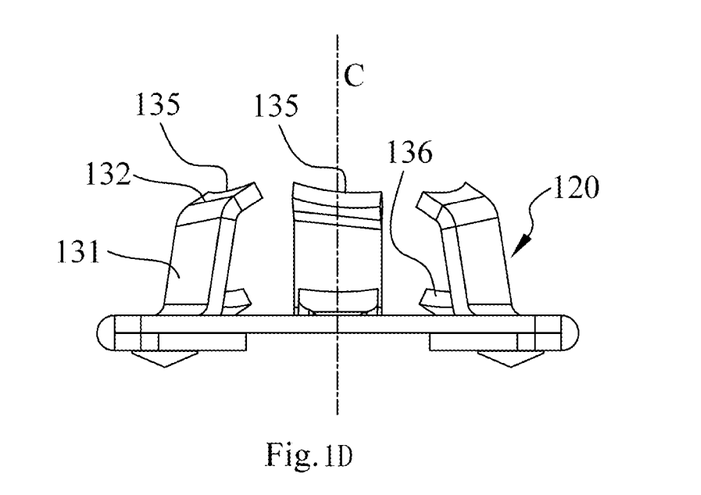
FIG. 1D is a side view of the fastening clamp of FIG. 1A.

FIG. 1A is a perspective view of a first example of a fastening clamp in the present application, FIG. 1B is a perspective view of the fastening clamp of FIG. 1A at a second angle, FIG. 1C is a top view of the fastening clamp of FIG. 1A, and FIG. 1D is a side view of the fastening clamp of FIG. 1A. FIGS. 1A-1D show a structure of the fastening clamp.

As shown in FIGS. 1A-1D, a fastening clamp 100 is used to connect a first component to a second component having a connecting post. The fastening clamp 100 includes a substrate 101 and a clamping portion 120. The substrate 101 is generally flat and has a first side 121 and a second side 122. The substrate 101 has a mounting hole 108 running through the first side 121 and the second side 122 of the substrate 101. The mounting hole 108 has a centerline C that extends through the center of the mounting hole 108 and perpendicular to the plane in which the mounting hole 108 is located. The clamping portion 120 extends from the first side 121 in a direction away from the substrate 101. The clamping portion 120 includes three first retaining legs 103, 104, and 105, and three second retaining legs 113, 114, and 115. The three first retaining legs 103, 104, and 105 and the three second retaining legs 113, 114, and 115 are staggered along a circumferential direction. The height of the three first retaining legs 103, 104, and 105 is greater than the height of the three second retaining legs 113, 114, and 115, so that the top of the three first retaining legs 103, 104, and 105 is higher than the height of the three second retaining legs 113, 114, and 115. The three first retaining legs 103, 104, and 105 and the three second retaining legs 113, 114, and 115 are all resilient to some extent and deflectable relative to the substrate 101. In some examples of the present application, the three first retaining legs 103, 104, and 105 and the three second retaining legs 113, 114, and 115 are provided with a thinned or narrowed design at a connection to the substrate to adjust elasticity of the three first retaining legs 103, 104, and 105 and the three second retaining legs 113, 114, and 115 to a suitable range.

Each of the three first retaining legs 103, 104, and 105 includes a body portion 131 and an extension portion 132, where the body portion 131 is located between the substrate 101 and the extension portion 132, and the body portion 131 is inclined at a greater angle with respect to the substrate 101 than the extension portion 132. Each of the first retaining legs 103, 104, and 105 generally presents a shape that curves toward the centerline C of the mounting hole 108. The distal end of the extension portion 132 forms a contact 135 capable of contacting the connecting post of the second component. The contact 135 is arranged along the direction of a helix line, i.e., extends helically around the centerline of mounting hole 108. Each contact 135 of the three first retaining legs 103, 104 and 105 is arranged around the cylindrical connecting post of the second component. The height of the contact 135 is different on both sides in the circumferential direction, where the height on a first side is greater than the height on a second side. The first side of each contact 135 is located between second sides of two adjacent contacts 135. That is, in the direction of rotation along the circumference, the first side of each contact 135 is located upstream or downstream of the second side.

The three second retaining legs 113, 114, and 115 extend from the substrate 101 towards the centerline C of the mounting hole. The distal end of each second retaining leg also has a contact 136, and similar to the contact 135, the contact 136 is capable of contacting the connecting post of the second component. The contact 136 is arranged along the direction of a helix line, i.e., extends helically around the centerline C of mounting hole 108. Each contact 136 of the three first retaining legs 113, 114 and 115 is arranged around the cylindrical connecting post of the second component. The height of the contact 136 is different on both sides in the circumferential direction, where the height on a first side is greater than the height on a second side. The first side of each contact 135 is located between second sides of two adjacent contacts 136. That is, in the direction of rotation along the circumference, the first side of each contact 136 is located upstream or downstream of the second side. The contacts arranged along the direction of the helix line facilitate removal of the fastening clamp from the second component.

In one example of the present application, the distance from the contact 136 to the centerline C is equal to the distance from the contact 135 to the centerline C.

In another example of the present application, the contact 136 is farther from the centerline C than the contact 135 is from the centerline C.

In one example of the present application, the first retaining legs 103, 104, and 105 and the second retaining legs 113, 114, and 115 are all deformed after being mounted in place, and the contact 135 and the contact 136 are clamped with the connecting post of the second component at different heights of the connecting post of the second component, which can further strengthen the pulling force between the fastening clamp and the connecting post of the second component.

In another example of the present application, the first retaining legs 103, 104 and 105 are deformed after being mounted in place, the contact 135 is clamped with the connecting post of the second component, a small amount of deformity or no deformation occurs at the contact 136, and the contact 136 has a small amount of clearance abutting on the connecting post of the second component or with the connecting post of the second component. The second retaining legs 113, 114, and 115 are used to prevent the fastening clamp from tilting relative to the connecting post of the second component.

The substrate 101 has a front side 161 and a back side 162, and a pair of convex portions 156 and 157 protruding from a second side 122 of the substrate 101. The convex portions 156 and 157 form an anti-release structure to prevent the fastening clamp from falling off of the second component. The convex portions 156 and 157 are generally triangular, and the convex portions 156 and 157 taper and gradually become thicker in a direction from the front side 161 to the back side 162. The convex portions 156 and 157 thus form a barb. The convex portions 156 and 157 have tips 158 and 159 proximate the back side 162, and the tips 158 and 159 are capable of at least partially clamping into the connecting post of the second component to prevent the fastening clamp from falling off of the connecting post of the second component.

In the present application, the fastening clamp is an integral member made through metal sheet stamping, and has a certain hardness. In the present application, the substrate 101 has double layers and is formed by bending a metal sheet, thereby strengthening the strength of the substrate 101.

Figure 2A:
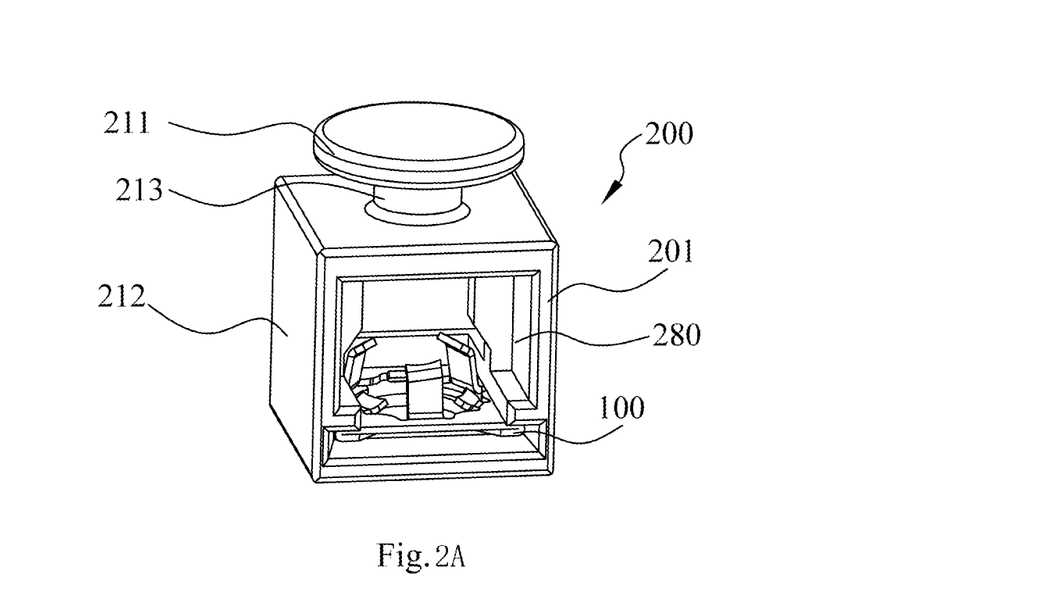
FIG. 2A is a perspective view of a first example of a fastening clamp assembly in the present application.
Figure 2B:
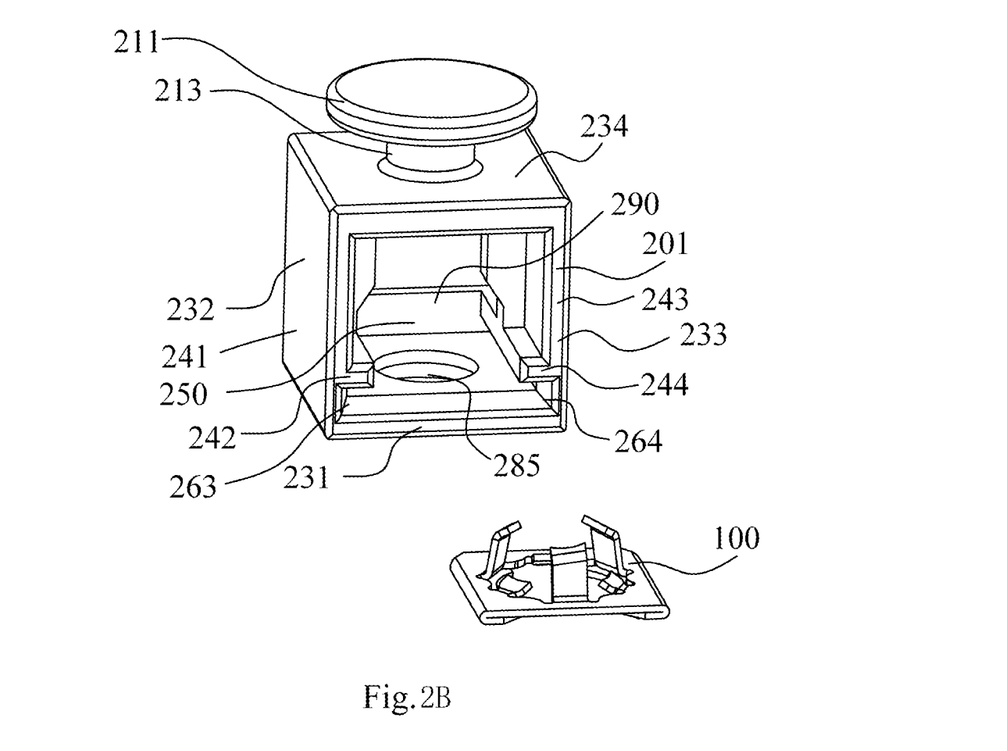
FIG. 2B is an exploded view of the fastening clamp assembly of FIG. 2A.
Figure 2C:
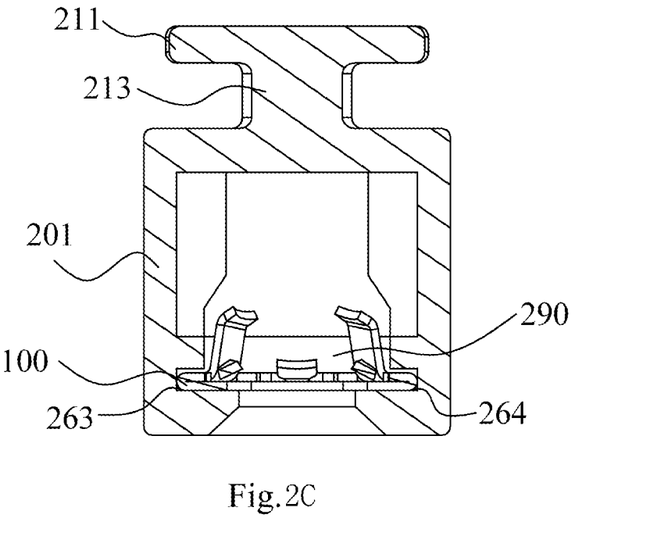
FIG. 2C is a cross-sectional view of a fastening clamp assembly in the present application.

FIG. 2A is a perspective view of a first example of a fastening clamp assembly in the present application, FIG. 2B is an exploded view of the fastening clamp assembly of FIG. 2A, and FIG. 2C is a cross-sectional view of the fastening clamp assembly in the present application.

As shown in FIGS. 2A and 2B, the fastening clamp assembly 200 includes a connection seat 201 and a fastening clamp 100, the fastening clamp 100 is mounted in the connection seat 201, and the connection seat 201 is used for connecting to the first component. The connection seat 201 includes a head 211, a neck 213, and a body 212, both of the head 211 and the neck 213 are cylindrical, and the diameter of the head 211 is larger than the diameter of the neck 213. The body 212 is generally a cube, and the body 212 includes a bottom 231, a pair of sides 232 and 233, and a top 234. The top 234 is connected to the head 211, and the top 234 is larger in size than the neck 213. The sides 232 and 233 extend from both sides of the bottom 231 and connect to the top 234. The sides 232 and 233, the bottom 231, and the top 234 enclose to form a cavity 250, and the fastening clamp is able to enter the cavity 250. The bottom 231 has an opening 285 in communication with the cavity 250. The side 232 includes a sidewall 241 and a convex edge 242 extending from an inner side of the sidewall 241 toward the side 233. The side 233 includes a sidewall 243 and a convex edge 244 extending from an inner side of the sidewall 243 toward the side 232. A receiving slot 263 is formed among the convex edge 242, the bottom 231, and the sidewall 241, and a receiving slot 264 is formed among the convex edge 24, the bottom 231, and the sidewall 243.

The body 212 also includes a front end and a back end, the front end has an opening 280, and the back end has a stop portion 290. The stop portion 290 and the bottom 231 extend towards the top 234. In one example of the present application, the stop portion 290 is flush with the top of the convex edges 242 and 244. The substrate 101 is capable of being inserted into the receiving slots 263 and 264 in a direction from the front side 161 to the back side 162. The receiving slots 263 and 264 can restrict movement of the fastening clamp 100 in the vertical direction. The convex portions 156 and 157 of the fastening clamp 100 can be clamped with the bottom 231 of the connection seat 201 to limit the fastening clamp 100 from sliding out of the connection seat in the direction from the back side 162 to the front side 161. The stop portion 290 can restrict the fastening clamp 100 from sliding out of the connection seat in the direction from the front side 161 to the back side 162. When the fastening clamp 100 is mounted in place in the connection seat 201, the fastening clamp 100 can be stably located in the connection seat 201. When the fastening clamp 100 is located in the connection seat 201, the mounting hole 108 of the fastening clamp 100 is aligned with the opening 285 of the connection seat 201.

In one example of the present application, the connection seat 201 is made of a plastic material having a hardness less than that of the fastening clamp 100.

Figure 3A:
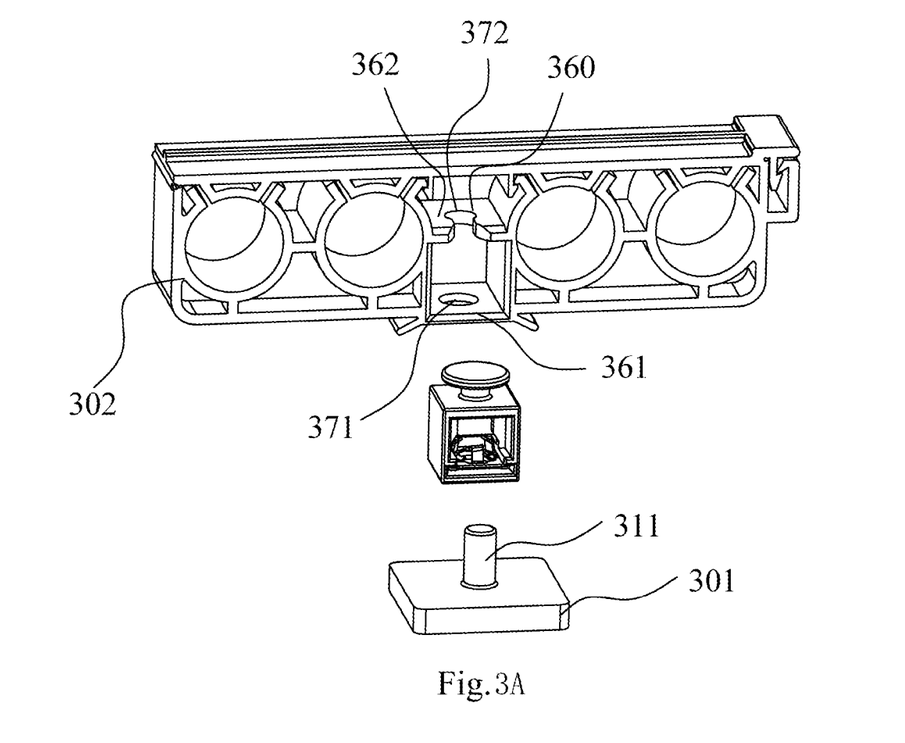
FIG. 3A is an exploded view of the fastening clamp assembly and a second component and a first component of the first example of FIG. 2A.
Figure 3B:
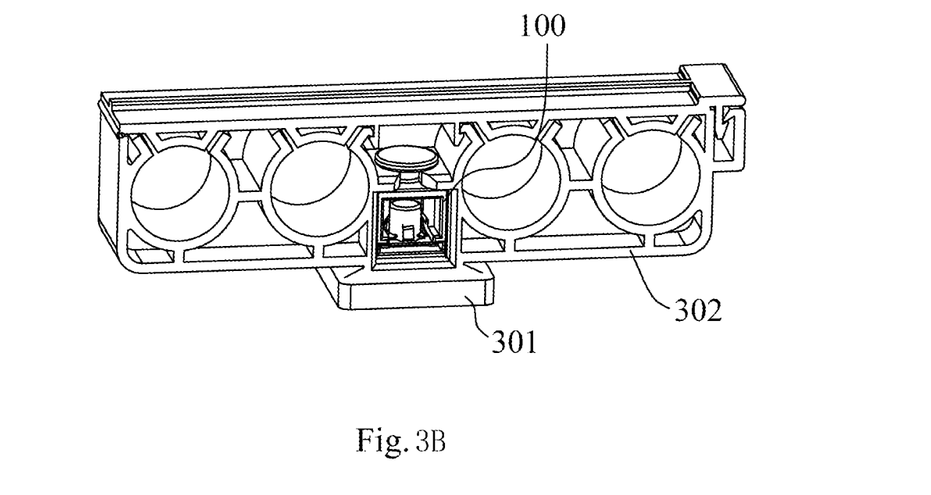
FIG. 3B is a perspective view of the fastening clamp assembly of FIG. 2A after being connected to the second component and the first component.
Figure 3C:
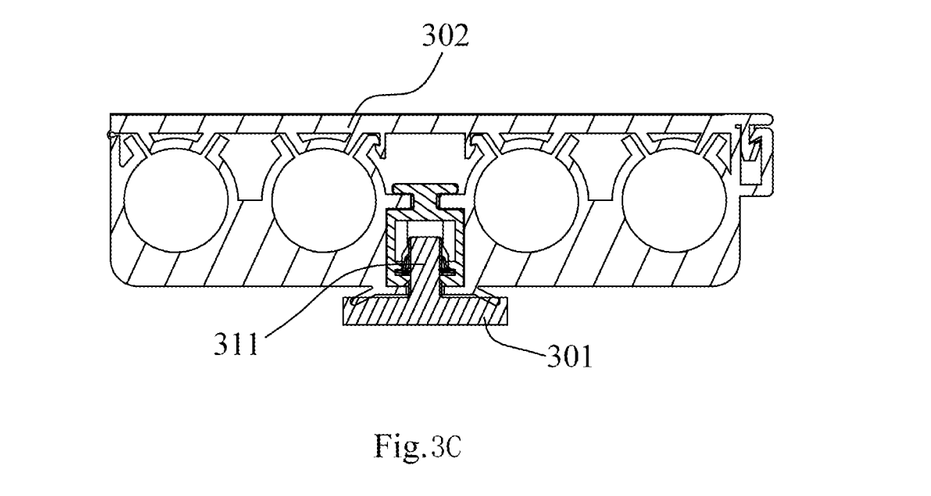
FIG. 3C is a cross-sectional view of the fastening clamp assembly of FIG. 2A after being connected to the second component and the first component.

FIG. 3A is an exploded view of the fastening clamp assembly and the second component and the first component of the first example of FIG. 2A, FIG. 3B is a perspective view of the fastening clamp assembly after being connected to the second component and the first component, and FIG. 3C is a cross-sectional view of the fastening clamp assembly after being connected to the second component and the first component of FIG. 2A.

As shown in FIGS. 3A-3C, a fastening clamp assembly 200 is capable of connecting a second component 301 to a first component 302. In one example of the present application, the second component 301 is a sheet metal of a vehicle body, the sheet metal has a sheet metal body and a cylinder 311 raised on the surface of the sheet metal body, and the first component is a pipe clamp for supporting a pipeline in a vehicle.

The first component has a pipe clamp connection portion 360 into which the fastening clamp assembly 200 can be loaded. The pipe clamp connection portion 360 includes a lower plate 361 having an opening 371 and an upper plate 362 having a slot 372. When the fastening clamp assembly 200 is connected to the first component, the neck 213 of the connection seat 201 is able to enter the slot 372, and the head 211 and the top of the body 212 are located on both sides of the upper plate 362, respectively, so that the fastening clamp assembly 200 cannot move in the vertical direction relative to the first component. The shape of the pipe clamp connection portion 360 matches the shape of the connection seat 201, so that the connection seat 201 cannot rotate relative to the first component 302.

When the second component 301 is to be connected to the first component 302, two connection operations may be employed as desired. The first operation first inserts the fastening clamp assembly 200 onto a cylindrical connecting post 311 of the second component 301 such that the cylindrical connecting post 311 passes through the opening 285 of the connection seat 201 and through the mounting hole 108 of the fastening clamp 100 in turn. When the fastening clamp assembly 200 is mounted in place, the top of the cylindrical connecting post 311 exceeds the distal ends of the three first retaining legs 103, 104, and 105, and the fastening clamp assembly 200 is clamped on the cylindrical connecting post 311 via the elasticity of the first retaining legs 103, 104, and 105 and the second retaining legs 113, 114, and 115. The first component 302 is then sleeved on the fastening clamp assembly 200 so that the first component 302 is connected to the connecting post 311 of the second component. The second operation first mounts the fastening clamp assembly 200 into the pipe clamp connection portion 360 of the first component 302, and then inserts the first component 302 and the fastening clamp assembly 200 together onto the cylindrical connecting post 311 of the second component 301.

In one example of the present application, when the fastening clamp 100 is connected to the cylindrical connecting post 311 of the second component 301, the first retaining legs 103, 104, and 105 and the second retaining legs 113, 114, and 115 are deflected and clamped against the sidewall of the cylindrical connecting post 311. The material hardness of the cylindrical connecting post 311 is lower than the material hardness of the contact of the first retaining legs and the second retaining legs, so that the contact can be partially inserted into the cylindrical connecting post 311 and the fastening clamp is stably clamped on the cylindrical connecting post 311. When all the first retaining legs and the second retaining legs are tilted towards the cylindrical connecting post 311, thereby applying an upward pulling force to the fastening clamp, the first retaining legs and the second retaining legs further clamp the cylindrical connecting post 311 such that the fastening clamp cannot be pulled out.

In another example of the present application, when the fastening clamp 100 is connected to the cylindrical connecting post 311 of the second component 301, the first retaining legs 103, 104 and 105 are deflected, clamped on the sidewall of the cylindrical connecting post 311, and the second retaining legs 113, 114 and 115 abut against or have a small gap with the cylindrical connecting post 311. That is, the second retaining legs 113, 114, and 115 can prevent the fastening clamp 100 from tilting relative to the cylindrical connecting post 311 of the second component 301; the first retaining legs 103, 104, and 105 clamp the cylindrical connecting post of the second component 301, preventing the fastening clamp 100 from disengaging from the cylindrical connecting post 311 of the second component 301.

Figure 4A:
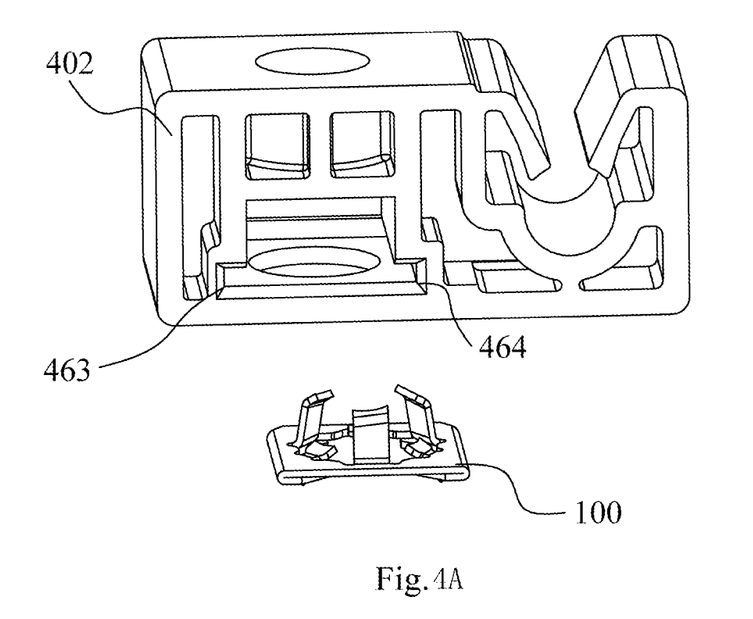
FIG. 4A is an exploded view of a fastening clamp assembly and a first component of a second example of the present application.
Figure 4B:
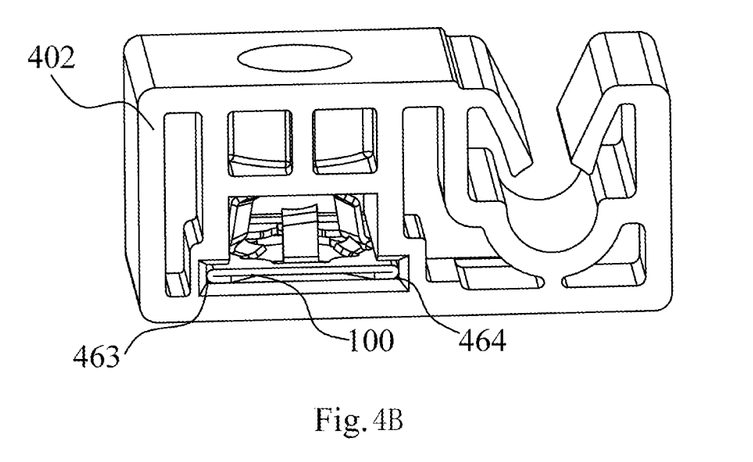
FIG. 4B is a perspective view of the fastening clamp assembly of the second example of FIG. 4A after being connected to the first component.

FIG. 4A is an exploded view of a fastening clamp assembly of a second example of the present application and FIG. 4B is a perspective view of the fastening clamp assembly of the second example of FIG. 4A after being connected to a first component.

In the examples shown in FIGS. 4A and 4B, the fastening clamp assembly includes a fastening clamp 100 and a first component 402. The first component 402 is a pipe clamp. The fastening clamp 100 may be mounted directly on the first component 402 without the need of providing the connection seat 201. The first component 402 is provided with receiving slots 463 and 464, and the fastening clamp 100 is able to enter the receiving slots 463 and 464 and is not easily disengaged from the first component. The first component 402 and the fastening clamp 100 can be connected together to the second component having a cylindrical connecting post.

That is, in the second example of the fastening clamp assembly, it is equivalent to integrate the connection seat on the first component 402 without the need for separate arrangement of the connection seat.

Figure 5A:
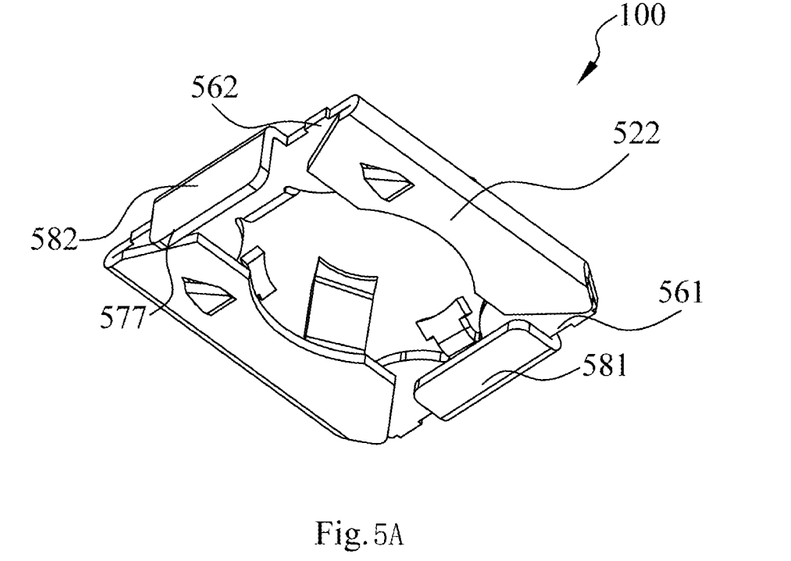
FIG. 5A is a perspective view of a second example of a fastening clamp in the present application.
Figure 5B:
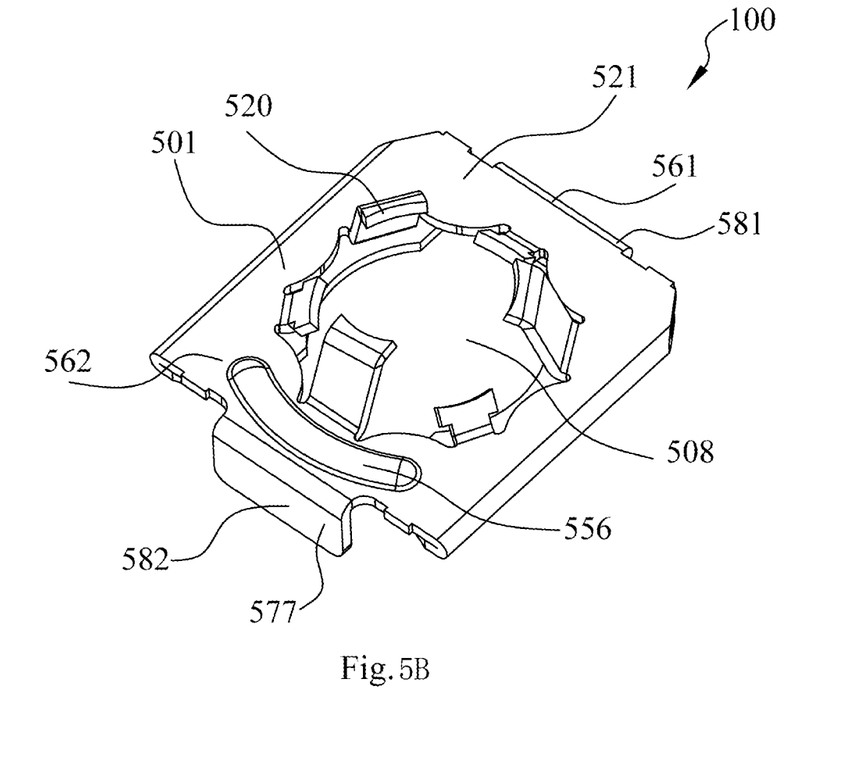
FIG. 5B is a perspective view of the fastening clamp of FIG. 5A at another angle.

FIG. 5A is a perspective view of a second example of a fastening clamp in the present application, and FIG. 5B is a perspective view of the fastening clamp of FIG. 5A at another angle. Similar to the fastening clamp of the first example shown in FIG. 1A, however, the structure of a substrate 501 of a fastening clamp 500 is different. As shown in FIGS. 5A and 5B, the fastening clamp 500 includes the substrate 501 and a clamping portion 520. The substrate 501 is generally flat and has a first side 521 and a second side 522. The clamping portion 520 extends outwardly from the first side 521 of the substrate 501. The substrate 501 also has a front side 561 and a back side 562, and a front side flap 581 and a back side flap 582. The back side flap 582 extends from the edge of the back side 562 in a direction away from the first side 521 of the substrate 501, to form a stop portion 577. That is, the extension direction of the back side flap 582 is substantially perpendicular to the extension direction of the substrate 501. The back side flap 582 and the clamping portion 520 are located on both sides of the substrate 501, respectively. The front side flap 581 is bent from the edge of the front side 161 towards the second side 522 of the substrate 501, and the extension direction of the front side flap 581 is the same as the extension direction of the substrate 501. In one example of the present application, the front side flap 581 fits the surface of the second side 522 of the substrate 501.

The substrate 501 also has a stiffener 556 protruding from the surface of the first side 521 of the substrate 501, the stiffener 556 is proximate to the back side 562 of the substrate 501, and the stiffener 556 is an arc curved toward the centerline of the mounting hole 508 of the substrate 501.

In this example, the stiffener 556, the front side flap 581, and the back side flap 582 all increase the strength of the fastening clamp 500 and prevent deformation of the fastening clamp 500.

Figure 6A:
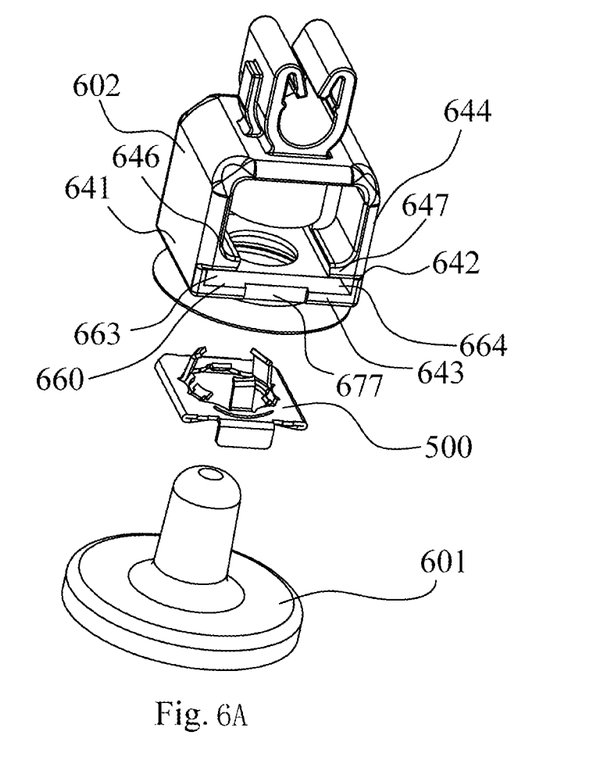
FIG. 6A is a perspective view of a third example of a fastening clamp assembly in the present application.
Figure 6B:
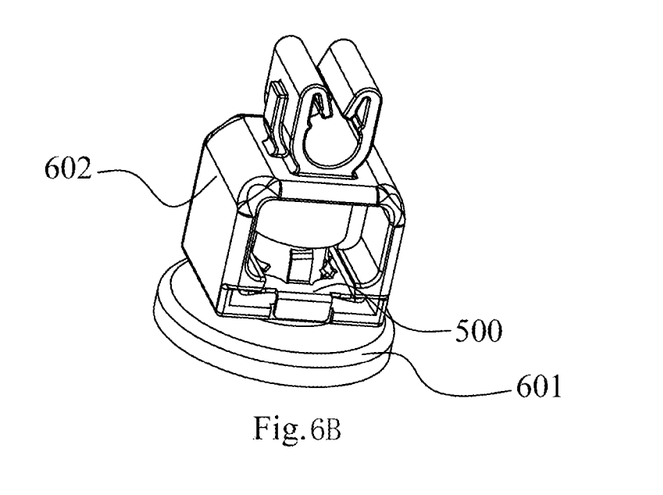
FIG. 6B is an exploded view of the fastening clamp assembly of FIG. 6A.

FIG. 6A is a perspective view of a third example of a fastening clamp assembly in the present application, and FIG. 6B is an exploded view of the fastening clamp assembly of FIG. 6A.

In the example shown in FIG. 6A, similar to the example shown in FIG. 4A, the fastening assembly includes a fastening clamp 500 and a first component 602. The first component 602 is a pipe clamp. The first component 602 has a pipe clamp connection portion 660. The pipe clamp connection portion 660 includes a pair of sidewalls 641 and 644, a bottom 643, and a pair of convex edges 646 and 647. The pair of sidewalls 641 are connected to both sides of the bottom 643 and extend generally perpendicular to the bottom 643. The pair of convex edges 646 and 647 extend from the inner side of the sidewalls 641 and 644 toward each other, respectively. The pair of sidewalls 641 and 644, the bottom 643, and the pair of convex edges 646 and 647 enclose to form a pair of receiving slots 663 and 664, and both sides of the substrate 501 of the fastening clamp 500 are able to enter into the receiving slots 663 and 664. The bottom 663 has a recess 677 whose shape mates with the shape of a stop portion 577 of the fastening clamp 500. When the fastening clamp 500 is mounted in place in the first component 602, the stop portion 577 enters the recess 677. The stop portion 577 can restrict movement of the fastening clamp 500 relative to the first component 602 in the insertion direction of the fastening clamp 500.

The fastening clamps 100 and 500 in the present application can be mounted on a cylindrical connecting post with a smooth outer wall. No threads or convex portions are required on the cylindrical connecting post. When a casting process is used for the vehicle body, the cylindrical connecting post may be integrally casted with the vehicle body, and they no longer need to be connected by welding or other joining processes.

Although only some features of the present application are illustrated and described herein, various improvements and variations may be made by those skilled in the art. It should therefore be understood that the appended claims are intended to cover all of the above improvements and variations falling within the spirit and range of the present application.

What is claimed is:

1. A fastening clamp, used for connecting a first component to a second component having a connecting post, comprising:
    a substrate on which a mounting hole is provided, wherein the mounting hole is used to receive the connecting post of the second component;
    at least two first retaining legs, proximal ends of the at least two first retaining legs connected to an edge of the mounting hole and extending obliquely from one side of the substrate towards one another in a direction away from the substrate, the at least two first retaining legs being resilient and configured to deflect about the proximal ends of the at least two first retaining legs; and
    at least two second retaining legs, proximal ends of the at least two second retaining legs connected to the edge of the mounting hole and extending obliquely from one side of the substrate towards one another in a direction away from the substrate, the at least two first retaining legs and the at least two second retaining legs being on the same side of the substrate;
        wherein distal ends of the at least two second retaining legs are closer to the substrate than distal ends of the two first retaining legs, and the at least two first retaining legs and the at least two second retaining legs are configured to be able to collectively retain the connecting post of the second component in the mounting hole,
        wherein each of the at least two first retaining legs comprises an extension portion and a body portion located between the substrate and the extension portion, and
        wherein the body portion is inclined at a greater angle with respect to the substrate than the extension portion is inclined with respect to the substrate.

2. The fastening clamp according to claim 1, wherein:
    the at least two second retaining legs are staggered with the at least two first retaining legs about the mounting hole.

3. The fastening clamp according to claim 1, wherein:
    the at least two second retaining legs and the at least two first retaining legs are arranged along a circumferential direction, the fastening clamp being clampable on the connecting post of the second component and rotating relative to the connecting post of the second component, the at least two second retaining legs being configured to contact a sidewall of the connecting post of the second component.

4. The fastening clamp according to claim 3, wherein:
    each of the at least two first retaining legs and each of the at least two second retaining legs have a first contact and a second contact, respectively, the first contact and the second contact being configured to contact the connecting post of the second component, and the first contact and the second contact extending helically around a centerline of the mounting hole.

5. The fastening clamp according to claim 4, wherein:
    a distance between the first contact and the centerline of the mounting hole is greater than a distance between the second contact and the centerline of the mounting hole.

6. The fastening clamp according to claim 5, wherein:
    the fastening clamp is integrally made of a metallic material.

7. The fastening clamp according to claim 5, wherein:
    hardness of the first contact and the second contact is greater than hardness of the connecting post of the second component.

8. The fastening clamp according to claim 1, wherein:
    the substrate has a first side and a second side, the at least two second retaining legs and the at least two first retaining legs extend outwardly from the first side, and the second side of the substrate has an anti-release structure.

9. The fastening clamp according to claim 8, wherein:
    the substrate has a front side and a back side, the fastening clamp is inserted into a mounting component in a direction from the front side to the back side, the anti-release structure is a convex portion protruding from a surface of the second side, and the convex portion tapers and gradually becomes thicker in the direction from the front side to the back side.

10. The fastening clamp according to claim 9, wherein:
    the back side of the substrate has a back side flap extending from an edge of the back side in a direction away from the first side of the substrate to form a stop portion.

11. The fastening clamp according to claim 9, wherein:
    the substrate has a stiffener protruding from a surface of the first side of the substrate, the stiffener is proximate to the back side of the substrate, and the stiffener is an arc curved toward a centerline of the mounting hole of the substrate.

12. The fastening clamp according to claim 1, wherein:
    a front side of the substrate has a front side flap bent inwardly from an edge of the front side, and the front side flap extends in the same direction as the substrate.

13. The fastening clamp according to claim 1, wherein the at least two first retaining legs and the at least two second retaining legs are provided with a thinner or narrowed profile at a connection to the substrate to adjust elasticity of the at least two first retaining legs and the at least two second retaining legs.

14. A fastening clamp assembly for connecting a first component to a second component having a connecting post, the fastening clamp assembly comprising:

a fastening clamp comprising:
a substrate on which a mounting hole is provided, wherein the mounting hole is used to receive the connecting post of the second component;
at least two first retaining legs, proximal ends of the at least two first retaining legs connected to an edge of the mounting hole and extending obliquely from one side of the substrate towards one another in a direction away from the substrate, the at least two first retaining legs being resilient and configured to deflect about the proximal ends of the at least two first retaining legs; and
at least two second retaining legs, proximal ends of the at least two second retaining legs connected to the edge of the mounting hole and extending obliquely from one side of the substrate towards one another in a direction away from the substrate, the at least two first retaining legs and the at least two second retaining legs being on the same side of the substrate; wherein distal ends of the at least two second retaining legs are closer to the substrate than distal ends of the two first retaining legs, and the at least two first retaining legs and the at least two second retaining legs are configured to be able to collectively retain the connecting post of the second component in the mounting hole; and a connection seat having a pair of receiving slots and a bottom, both sides of the substrate being able to enter the pair of receiving slots respectively to restrict movement of the fastening clamp in a direction perpendicular to the substrate; the bottom having an opening that aligns with the mounting hole when the fastening clamp is mounted in the connection seat.

15. The fastening clamp assembly according to claim 14, wherein:
the connection seat has a pair of sides extending from both sides of the bottom, the pair of sides are disposed oppositely, and each of the pair of sides comprises a sidewall and a convex edge, wherein the sidewall is connected to the bottom, the convex edge extends from the sidewall towards the other side of the pair of sides, and the side and the convex edge enclose to form a receiving slot in a pair of receiving slots.

16. The fastening clamp assembly according to claim 15, wherein:
the connection seat is removably connected or integrally formed with the first component.

17. A fastening clamp for connecting a first component to a second component having a connecting post, the fastening clamp comprising:

a substrate on which a mounting hole is provided, wherein the mounting hole is used to receive the connecting post of the second component;
at least two first retaining legs, proximal ends of the at least two first retaining legs connected to an edge of the mounting hole and extending obliquely from one side of the substrate towards one another in a direction away from the substrate, the at least two first retaining legs being resilient and configured to deflect about the proximal ends of the at least two first retaining legs; and
at least two second retaining legs, proximal ends of the at least two second retaining legs connected to the edge of the mounting hole and extending obliquely from one side of the substrate towards one another in a direction away from the substrate, the at least two first retaining legs and the at least two second retaining legs being on the same side of the substrate;
wherein distal ends of the at least two second retaining legs are closer to the substrate than distal ends of the two first retaining legs, and the at least two first retaining legs and the at least two second retaining legs are configured to be able to collectively retain the connecting post of the second component in the mounting hole,
wherein the substrate has a first side and a second side, the at least two second retaining legs and the at least two first retaining legs extend outwardly from the first side, and the second side of the substrate has an anti-release structure, and
wherein the fastening clamp is inserted into a mounting component in a direction from a front side to a back side, the anti-release structure is a convex portion protruding from a surface of the second side, and the convex portion tapers and gradually becomes thicker in the direction from the front side to the back side.

18. The fastening clamp according to claim 17, wherein:
the back side of the substrate has a back side flap extending from an edge of the back side in a direction away from the first side of the substrate to form a stop portion.

19. The fastening clamp according to claim 17, wherein:
the substrate has a stiffener protruding from a surface of the first side of the substrate, the stiffener is proximate to the back side of the substrate, and the stiffener is an arc curved toward a centerline of the mounting hole of the substrate.

20. The fastening clamp according to claim 17, wherein:
the fastening clamp is integrally made of a metallic material.

* * * * *